April 11, 1939. M. B. BRENNEMAN 2,154,122

WATER CATCHER FOR FISHING REELS

Filed July 15, 1938

M. B. BRENNEMAN INVENTOR.

BY Merrill M. Blackburn
ATTORNEY.

Patented Apr. 11, 1939

2,154,122

UNITED STATES PATENT OFFICE 2,154,122

WATER CATCHER FOR FISHING REELS

Milton B. Brenneman, Davenport, Iowa

Application July 15, 1938, Serial No. 219,397

2 Claims. (Cl. 242—84.1)

The present invention pertains to fishing reels and more particularly to means for keeping away from the hands of the user of the reel such water as follows the fishing line to the reel when the line is being reeled in. Among the objects of this invention are to prevent water from reaching the hands of the user of the reel, particularly in cold weather; to provide apparatus for the purpose indicated which will not, normally, be contacted by the line when the line is being unreeled or reeled in; to provide a fishing reel the structure of which is so modified that the water following the fishing line to the reel is caught and kept away from the hands of the user; to provide a structure which may be added to a reel to accomplish the purpose stated when such reel has not been so equipped by the manufacturer; to provide a structure for the purpose indicated which will not retard the free running of the line when casting; and such further objects, advantages, and capabilities as will hereafter appear and as are inherent in the construction disclosed herein. My invention further resides in the combination, construction, and arrangement of parts illustrated in the accompanying drawing and, while I have shown therein what is now regarded as the preferred forms of this invention, I desire the same to be understood as illustrative only and not to be interpreted in a limiting sense.

In the drawing annexed hereto and forming a part hereof,

Figures 1, 4:
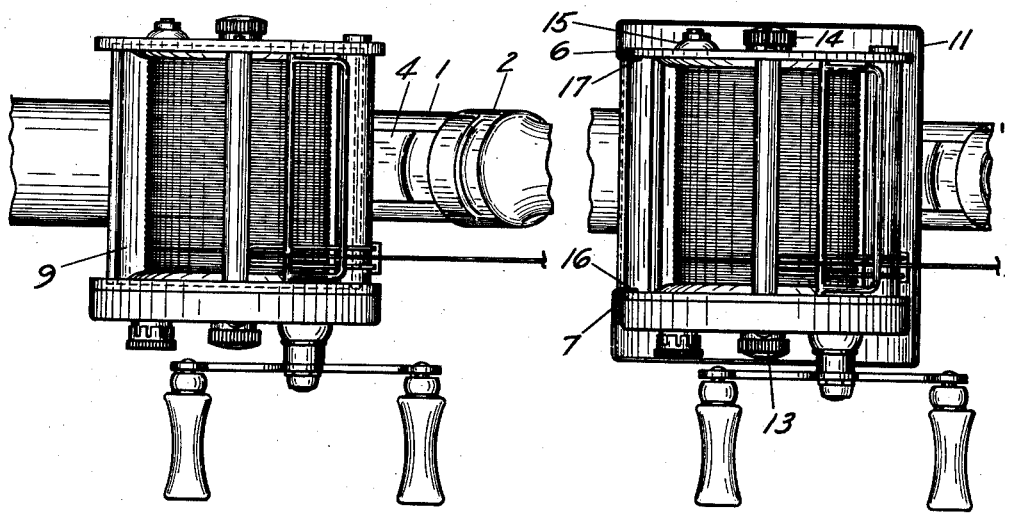
Fig. 1 represents in plan view a reel and a part of a fishing rod, the reel embodying one form of my invention.
Fig. 4 is a view similar to Fig. 1, showing an alternative form of my invention.

Reference will now be made in greater detail to the annexed drawing for a more complete description of this invention. The fishing rod 1 is conventional and is provided with the usual collars 2 and 3 for the attachment of the base or bracket 4 of the reel 5. In this form of my invention, the end plates 6 and 7 of the reel are provided with grooves 8 for the reception of the curved plate 9, the curved edges of which fit rather accurately in the grooves. Therefore, when the bolts 10 which hold the reel together are tightened up, the plate 9 fits sufficiently snugly in the grooves to prevent any water collecting in the cup formed by the plate 9 and the end plates 6 and 7 from escaping and dripping upon the hands of the user. Before casting again, the user may turn the rod over so as to empty the water out of the cup.

Figures 2, 5:
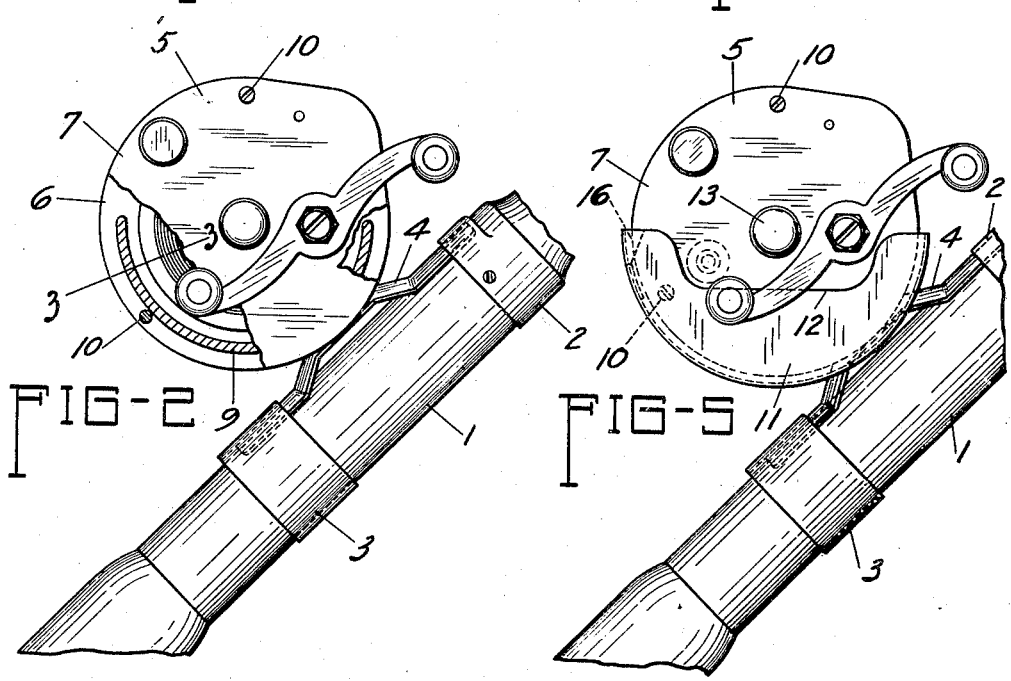
Fig. 2 represents a side elevation of the structure shown in Fig. 1, partly broken away.
Fig. 5 represents a side elevation of the structure shown in Fig. 4.
Figure 3:
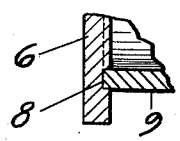
Fig. 3 represents a fragmentary section along a plane comparable to the plane indicated by the line 3—3, Fig. 2.

The foregoing describes a structure embodying my invention when so made at the factory. A different structure and arrangement is provided to be applied to reels already in use. This different structure is shown in Figs. 4 and 5 and comprises a cup 11 which surrounds the lower portion of the reel when the fishing rod is held in the normal reeling-in position. The ends of the cup 11 are notched, as shown at 12, to afford access to the parts 13, 14, and 15 which may need to be adjusted during use of the reel, as will be understood by anyone familiar with the use of such equipment. Ears 16 and 17 of the cup are turned in to engage the inner faces of the end plates 6 and 7 of the reel to assist in holding the cup in place. If the cup is made of sufficiently substantial material, these ears 16 and 17 will be unnecessary but they are believed to be desirable even with very heavy material. In this form of construction, it is desirable to secure the cup rigidly to the bracket 4 so that the cup will be held in place properly and so that water will not be permitted to leak out at the point of attachment of the cup to the bracket. The use of this form of my device is the same as that described above in connection with the form shown in Figs. 1, 2, and 3.

It will be obvious from the drawing and the foregoing description that I have provided a structure which will accomplish the objects set forth above.

It will of course be understood that the specific description of structure set forth above may be departed from without departing from the spirit of my invention as set forth in this specification and the appended claims.

Having now described my invention, I claim:

1. In a fishing reel, a pair of end plates grooved in the vicinity of their edges, on their opposite faces, for the reception of a curved plate, and a curved plate having its opposite curved edges fitted in the grooves of the end plates, said end plates and the curved plate forming a cup below the rotating drum of the reel when the rod to which the reel is attached is held in normal reeling-in position.

2. A fishing reel comprising a reel proper, a bracket whereby it may be attached to a rod, and a water-collecting cup surrounding that part of the reel proper which is normally at the bottom when a line is being reeled in, the upper portion of the reel projecting out of the cup and the ends of the cup projecting beyond the ends of the reel whereby to form a receptacle in which the lower portion of the reel is contained during use but the upper portion is exposed for ready access.

MILTON B. BRENNEMAN.